US007454033B2

(12) United States Patent
Stach et al.

(10) Patent No.: US 7,454,033 B2
(45) Date of Patent: *Nov. 18, 2008

(54) QUANTIZATION-BASED DATA HIDING EMPLOYING CALIBRATION AND LOCALLY ADAPTIVE QUANTIZATION

(75) Inventors: John Stach, Tualatin, OR (US); Hugh L. Brunk, Portland, OR (US); Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 761 days.

This patent is subject to a terminal disclaimer.

(21) Appl. No.: 10/469,474

(22) PCT Filed: Mar. 22, 2002

(86) PCT No.: PCT/US02/08844

§ 371 (c)(1),
(2), (4) Date: Jun. 14, 2004

(87) PCT Pub. No.: WO02/078234

PCT Pub. Date: Oct. 3, 2002

(65) Prior Publication Data

US 2004/0250078 A1 Dec. 9, 2004

Related U.S. Application Data

(63) Continuation-in-part of application No. 09/895,867, filed on Jun. 28, 2001, now Pat. No. 6,483,927.

(60) Provisional application No. 60/278,049, filed on Mar. 22, 2001.

(51) Int. Cl.
*H04K 1/00* (2006.01)
(52) U.S. Cl. .................................................. 382/100
(58) Field of Classification Search ............ 382/100, 382/232; 713/176; 380/54, 287; 358/3.28
See application file for complete search history.

(56) References Cited

U.S. PATENT DOCUMENTS 5,636,292 A * 6/1997 Rhoads ........................ 382/232

(Continued)

FOREIGN PATENT DOCUMENTS

WO       WO 99/60514 A1 * 11/1999

(Continued)

OTHER PUBLICATIONS

Chen et al., "Dither modulation: a new approach to digital watermarking and information hiding," Proc. SPIE vol. 3657: Security and Watermarking of Multimedia Contents, Jan. 1999, pp. 342-353.*

(Continued)

*Primary Examiner*—Andrew W Johns

(57) ABSTRACT

Certain forms of distortion make it difficult to recover hidden data embedded in an audio or image signal by quanitzation techniques. To compensate for this distortion, an embedded data reader analyzes a statistical distribution (e.g., a histogram) of feature samples (124) in an audio or image signal suspected of having hidden auxiliary data to derive an estimate of quantizers used to encode a reference signal (126). The estimated quantizers then recover the reference signal (126), and the reader uses the reference signal (126) to determine and compensate for geometric or temporal distortion, like spatial scaling and rotation of image data, and time scale and speed changes of audio data. After compensating for such distortion, the reader can then more accurately recover hidden message data using quantization techniques to extract the message. The reference signal (126) is preferably repeated in blocks of the image or audio data to enable synchronization at many points in an image or audio data stream. An adaptive embedding and reading technique is used to adaptively define the quantization bins for regions of a host media signal based on signal statistics for each of the regions.

15 Claims, 9 Drawing Sheets

U.S. PATENT DOCUMENTS

| | | | |
|---|---|---|---|
| 6,233,347 B1 * | 5/2001 | Chen et al. | 382/100 |
| 6,314,192 B1 * | 11/2001 | Chen et al. | 382/100 |
| 6,332,031 B1 | 12/2001 | Rhoads et al. | 382/100 |
| 6,353,672 B1 * | 3/2002 | Rhoads | 382/100 |
| 6,396,937 B2 * | 5/2002 | Chen et al. | 382/100 |
| 6,400,826 B1 * | 6/2002 | Chen et al. | 382/100 |
| 6,483,927 B2 * | 11/2002 | Brunk et al. | 382/100 |
| 6,574,350 B1 | 6/2003 | Rhoads et al. | 382/100 |
| 6,580,808 B2 | 6/2003 | Rhoads | 382/100 |
| 6,614,914 B1 | 9/2003 | Rhoads et al. | 382/100 |
| 6,636,615 B1 | 10/2003 | Rhoads et al. | 382/100 |
| 6,700,990 B1 | 3/2004 | Rhoads | 382/100 |
| 6,718,047 B2 | 4/2004 | Rhoads | 382/100 |
| 6,850,626 B2 | 2/2005 | Rhoads et al. | 380/100 |
| 7,062,069 B2 | 6/2006 | Rhoads | 382/100 |
| 7,113,614 B2 | 9/2006 | Rhoads | 382/100 |
| 7,116,781 B2 | 10/2006 | Rhoads | 380/59 |
| 7,266,217 B2 | 9/2007 | Rhoads et al. | 382/100 |
| 7,391,881 B2 | 6/2008 | Sharma | 382/100 |

FOREIGN PATENT DOCUMENTS

| | | |
|---|---|---|
| WO | WO 00/65536 A1 * | 11/2000 |

OTHER PUBLICATIONS

Chen et al., "An Information-Theoretic Approach to the Design of Robust Digital Watermarking Systems," IEEE Proc. Int. Conf. on Acoustics, Speech, and Signal Processing, Mar. 1999, pp. 2061-2064.*

Chen et al., "Achievable Performance of Digital Watermarking Systems," IEEE Proc. Int. Conf. on Multimedia Computing and Systems, Jun. 1999, pp. 13-18.*

Chen et al., "Provably robust digital watermarking," Proc. SPIE vol. 3845: Multimedia Systems and Applications II, Sep. 1999, pp. 43-54.*

Ogawa et al., "Digital Watermaking Technique for Motion Pictures Bsed on Quantization," IEICE Trans. Fundamentals, vol. E83-A, No. 1, Jan. 2000, pp. 77-89.*

Eggers et al., "Quantization Watermarking," Proc. SPIE vol. 3971: Security and Watermarking of Multimedia Contents II, Jan. 2000, pp. 60-71.*

Chen et al., "Preprocessed and postprocessed quantization index modulation methods for digital watermarking," Proc. SPIE vol. 3971: Security and Watermarking of Multimedia Contents II, Jan. 2000, pp. 48-59.*

Chen, "Design and Analysis of Digital Watermarking, Information Embedding, and Data Hiding Systems, " Ph.D. Thesis at Massachusetts Institute of Technology, Jun. 2000.*

Gang et al., "Periodic Signaling Scheme in Oblivious Data Hiding," IEEE Proc. 34th Asilomer Conf. on Signals, Systems and Computers, Oct./Nov. 2000, pp. 1851-1855.*

Brunk, "Quantizer characteristics important for Quantization Index Modulation," Proc. SPIE vol. 3414: Security and Watermarking of Multimedia Contents III, Jan. 2001, pp. 686-694.*

Chen et al., "Quantization Index Modulation Methods for Digital Watermarking and Information Embedding of Multimedia," Journal of VLSI Signal Processing, vol. 27, Feb. 20001, pp. 7-33.*

Chen et al., "Quantization Inces Modulation: A Class of Provably Good Methods for Digital Watermarking and Information Hiding," IEEE Transactions on Information Theory, vol. 47, No. 4, May 2001, pp. 1423-1443.*

Meerwald, "Quantization Watermarking in the JPEG2000 Coding Pipeline," Communications and Multimedia Security Issues of the New Century: Proc. IFIP Conf. on Communications and Multimedia Security, May 2001, pp. 69-79.*

Non-Final Office Action mailed Aug. 31, 2007 in U.S. Appl. No. 11/456,813.

* cited by examiner

Affine transformation of circle

Before affine transformation

After affine transformation

| REF | Q | REF |
|---|---|---|
| Q | Q | Q |
| REF | Q | REF |

Fig. 10

QUANTIZATION-BASED DATA HIDING EMPLOYING CALIBRATION AND LOCALLY ADAPTIVE QUANTIZATION

This application is the national stage of PCT/US02/08844 filed Mar. 22, 2002 which claims priority to U.S. Patent Application 60/278,049, filed Mar. 22, 2001, and is a continuation in part of application Ser. No. 09/895,867, filed Jun. 28, 2001 now U.S. Pat. No. 6,483,927.

TECHNICAL FIELD

The invention relates to multimedia signal processing, steganography and data hiding.

BACKGROUND AND SUMMARY

Digital watermarking is a process for modifying physical or electronic media to embed machine-readable auxiliary data into the media. The media may be modified such that the embedded code is imperceptible or nearly imperceptible to the user, yet may be recovered through an automated reader process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 6,122,403 which are hereby incorporated by reference.

One category of data hiding methods embeds auxiliary data by quantizing samples or other features of a media signal such that the quantized sample falls within a quantization bin corresponding to a desired auxiliary message symbol. The message symbols may be binary or M-ary. Preferably, the modification made to the sample to move it into the quantization bin is constrained to stay within a desired perceptual distortion tolerance. This perceptual distortion tolerance enables the auxiliary data to be hidden in a manner that is imperceptible to the viewer or listener of embedded media content. One form of such auxiliary data embedding and reading is referred to as Quantization Index Modulation or QIM. Examples of this form of data hiding is disclosed in WO9960514A1: SYSTEM, METHOD, AND PRODUCT FOR INFORMATION EMBEDDING USING AN ENSEMBLE OF NON-INTERSECTING EMBEDDING GENERATORS and corresponding U.S. Pat. No. 6,233,347; which are hereby incorporated by reference.

To read embedded data, the samples of content expected to include auxiliary data are evaluated to determine which quantizer or quantization bin they represent. Symbol errors may result when samples get mapped to a different quantizer or quantization bin relative to the one used to encode them. Error correction encoding tends to mitigate symbol errors if the distortion is not significant or does not impact the embedded data adversely.

Quantization embedding techniques may be performed on samples or other signal features in various signal or transform domains of multimedia signals. To reduce the impact of distortion, the embedding domain may be chosen such that samples in that domain are relatively robust or invariant to expected types of distortion.

A challenge associated with data hiding methods, including quantization embedding techniques, is synchronizing the reader with the embedded data after the host signal carrying the embedded data has been distorted, e.g., geometrically or temporally distorted. Such forms of distortion have the effect of distorting the quantization bins. Thus, if the same quantizers or bins are used to interpret embedded data symbols in the reader as in the embedder, the reader may map distorted samples to the wrong quantizer or bin. Additional types of distortion that specifically effect quantization embedding techniques include the addition of an unknown offset or multiplication by an unknown gain.

The invention provides methods of synchronizing embedded data readers in quantization embedding systems for multimedia content. In the embedder, a reference signal and message symbols are encoded using a quantization embedding method. In the reader, the distorted data samples are evaluated to derive quantizers or quantization bins. The reader then uses the derived quantization information to convert the distorted data to raw symbol estimates. These raw symbol estimates are then evaluated to detect the presence of the reference signal. Once detected, the reference signal is used to determine the distortion and compensate for it by adjusting the quantization information or distorted data such that message symbols may be decoded more accurately.

Certain forms of offset and gain distortion make it difficult to recover hidden data embedded in an audio or image signal by quantization techniques. To compensate for this offset and gain distortion, an embedded data reader analyzes a statistical distribution (e.g., a histogram) of feature samples in an audio or image signal suspected of having hidden auxiliary data to derive an estimate of quantizers used to encode a reference signal (deriving an estimate of the quantizers is equivalent to estimating the offset and gain distortions). The estimated quantizers then recover the reference signal, and the reader uses the reference signal to determine and compensate for geometric or temporal distortion, like spatial scaling and rotation of image data, and time scale and speed changes of audio data. After compensating for such distortion, the reader can then more accurately recover hidden message data using quantization techniques to extract the message. The reference signal is preferably repeated in blocks of the image or audio data to enable synchronization at many points in an image or audio data stream.

The invention provides a method of hiding auxiliary data in a media signal such that the auxiliary data is humanly imperceptible yet recoverable by an automated auxiliary data reader. This method comprises segmenting the media signal into regions, determining statistics for the regions, and adapting quantization bins for each region based on the statistics calculated for the region. To hide auxiliary data in the regions, the method quantizes signal characteristics in the regions into the quantization bins adapted for the regions. The quantization bins correspond to auxiliary data symbols and the signal characteristics are quantized into selected bins depending on the auxiliary data symbol to be embedded in the signal characteristics.

Another aspect of the invention is a compatible reading method for this hidden data embedding method. The reading method segments the media signal into regions, determines statistics for the regions, and based on the statistics for each region, adapts quantization bins for the region. To extract auxiliary data hidden in the regions, the method maps signal characteristics in the regions into the quantization bins adapted for the regions. The quantization bins correspond to auxiliary data symbols, and thus symbols are extracted depending on which bins the signal characteristics map into. In the embedding method, the signal characteristics have been quantized into selected bins depending on the auxiliary data symbols embedded in the signal characteristics.

Further features will become apparent with reference to the following detailed description and accompanying drawings.

BRIEF DESCRIPTION OF THE DRAWINGS

FIG. 10 shows an example of an image segment comprised of a three by three pixel region.

DETAILED DESCRIPTION

Synchronization in Quantization Based Data Hiding Systems

This section describes techniques for synchronizing auxiliary data readers in quantization based data embedding systems.

Figure 1:
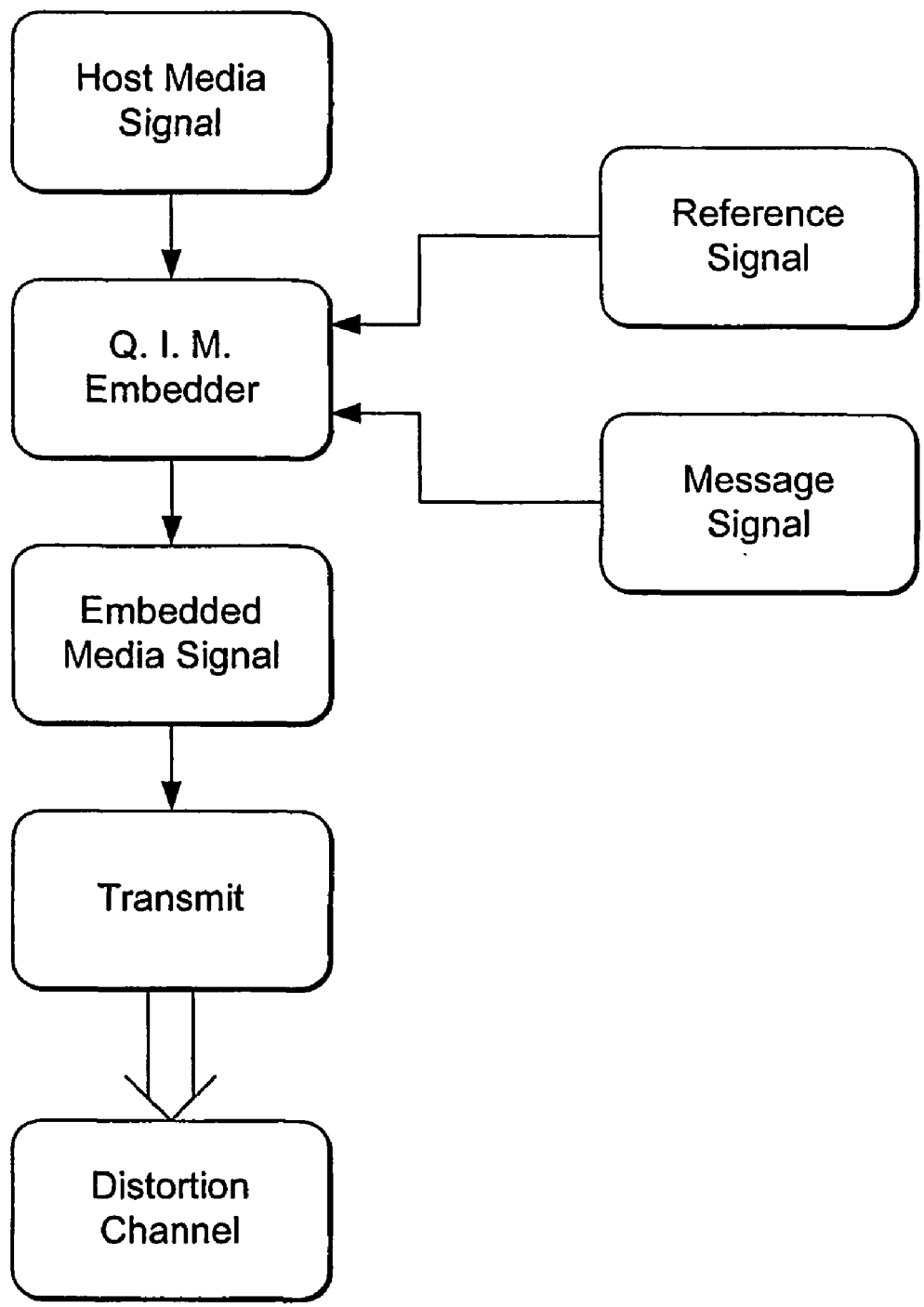
FIG. 1 is a diagram of a quantization type steganographic embedder that embeds a hidden reference signal in media signals for synchronization.

FIG. 1 is a diagram illustrating a quantization type data embedder that embeds a reference signal for synchronization. The embedder receives a host media signal such as a block of audio or image data. For the sake of illustration, we describe embedders that operate on samples in the spatial domain of a digital image block (e.g., luminance samples) and the time domain of a digital audio block. Alternatively, the block of image data may be transformed into samples in a DCT, DWT, DFT, Fourier Mellin, Gabor, autocorrelation or some other transform domain. The block of audio data similarly may be transformed into subbands, frequency coefficients, a time-frequency spectrogram, autocorrelation domain, etc. In such cases, the quantization embedder modifies samples in the transform domain, and an inverse transform returns the data to its perceptual domain for rendering in a form that is visible or audible to humans.

In some implementations, the embedder may be integrated with audio or image compression operators that transform the signal into a frequency domain, remove data in a lossy quantization process, and perform some form of entropy coding on the resulting data block. In this case, the quantization type data embedder operates on the frequency domain data after lossy compression.

In an embodiment for images, the reference signal comprises a two-dimensional array of binary symbols (1, 0). Similarly, the message signal comprises a two-dimensional signal of binary symbols. The reference signal has frequency domain characteristics that facilitate its detection while minimizing its impact on perceptible distortion in the embedded image. In particular, the reference signal comprises an array of impulse functions in a transform domain (e.g., autocorrelation domain, Fourier domain). These impulse functions have pseudorandom phase. When transformed to the transform domain, the reference signal has peaks that are detected using peak detection methods (such as those described later in this document), and then aligned with reference peaks to calculate orientation parameters, such as rotation and scale. The detected peaks are aligned with reference peaks using correlation filtering.

In an embodiment for audio data, the reference signal comprises either a one-dimensional or a two-dimensional array of binary symbols (1, 0). The two dimensional form refers to an implementation where the audio block is transformed to a 2D spectrogram, and the samples in the 2D reference signal correspond to samples in the 2D spectrogram. Similarly, the message signal comprises either a one or a two-dimensional signal of binary symbols. The reference signal has characteristics that facilitate its detection while minimizing its impact on perceptible distortion in the embedded audio block. In one implementation, the reference signal comprises a PN sequence. Like the image case above, the reference signal may have transform domain characteristics that facilitate detection of the reference signal in a transform domain.

For an example of embedding data in a spectrogram of an audio signal, see U.S. patent application Ser. No. 09/661,900, filed Sep. 14, 2000, entitled WATERMARKING IN THE TIME-FREQUENCY DOMAIN, which is hereby incorporated by reference. Quantization based embedding and reading of steganographic data as described in this document and those incorporated by reference may be performed in the time-frequency domain as detailed in application Ser. No. 09/661,900. In particular, the calibration and/or synchronization signals described in Ser. No. 09/661,900 may be embedded and read using the techniques described in this document.

The message signal is preferably error correction encoded. Some examples of error correction codes include convolutional codes, turbo codes, and BCH codes.

The message signal may be integrated with the reference signal, such as by convolving or multiplying it with the reference signal. For example, the reference signal may serve as a carrier signal for the message signal, where the reference signal is used to spread spectrum modulate the message signal in a multiplication, convolution, exclusive OR or exclusive NOR operation combining the message and reference signal. For example, the message signal may be formed into a signal that has reference peaks in a transform domain, such as the autocorrelation domain or Fourier domain. These reference peaks serve as a reference signal to enable detection by correlating a transformed version of extracted message data with a known reference signal.

The message and reference signal may be embedded in mutually exclusive samples of the host media signal such that the two signals do not overlap. Alternatively, the message and reference signal may be embedded in feature sample domains that overlap.

The quantization type embedder reads the reference and message signals and maps elements in these signals to corresponding samples in the host signal block. If the message and reference signals are combined (e.g., by multiplication or convolution), then the embedder operates on the elements of the composite message and reference signal. It then quantizes the corresponding host sample according to the binary symbol to be encoded. One binary symbol corresponds to a first quantizer, while the other binary symbol corresponds to a different quantizer. The selected quantizer modifies the corresponding sample to fall within a bin for that quantizer that minimizes the distortion to the sample.

The above auxiliary data embedders trade-off perceptual distortion and robustness by adjusting the size and spacing between quantization bins. These embedders may be implemented using uniform scalar quantizers. For example, each binary symbol is associated with a quantizer having bins of width delta and offsets relative to bins of the other symbol of delta/2. This simple form of quantizer facilitates the derivation of the quantizer parameters in the reader.

Different types of quantizers may be used for the reference and message signals. In particular, the reference signal is embedded using a scalar quantizer, while the message signal is embedded with a vector quantizer (e.g., a trellis coded vector quantizer).

Figure 2:
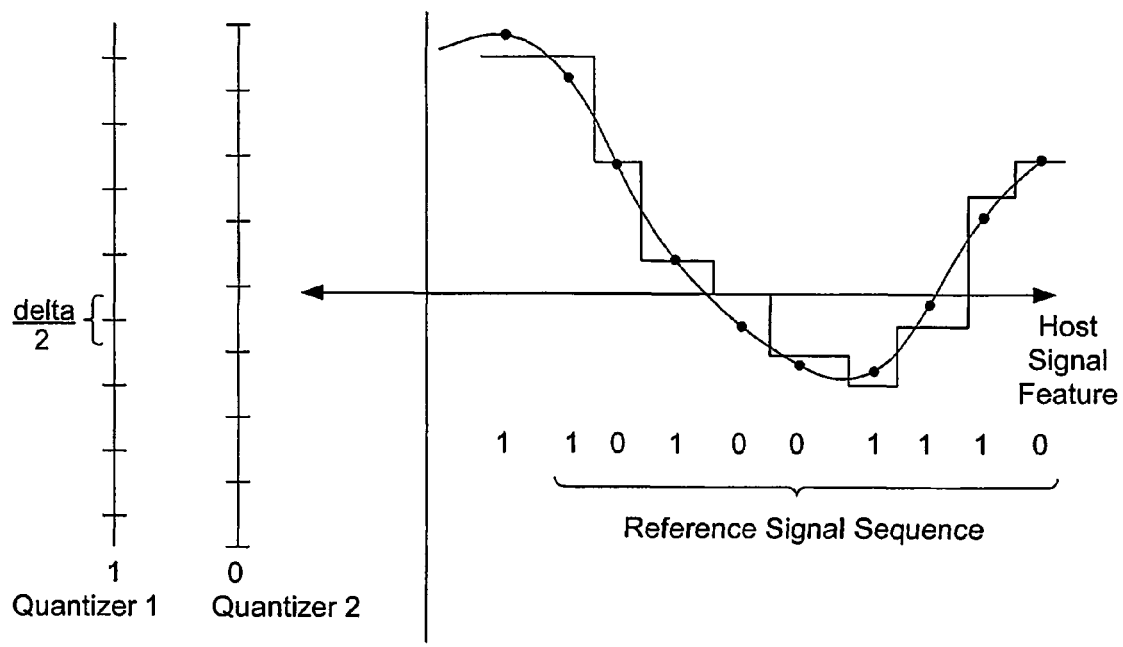
FIG. 2 is a diagram illustrating an example of quantizers for embedding binary symbols of a hidden reference signal by quantizing host signal features into quantization bins corresponding to the binary symbols.

FIG. 2 shows an example of quantizers for embedding a binary reference signal by quantizing features of the host media signal. One quantizer has a series of bins of size delta that correspond to a first binary symbol, while the other quantizer has a series of bins of size delta, offset by a distance delta/2 relative to the first quantizer, that correspond to a second binary symbol. The host signal feature, which has a value varying over some dimensions, such as time, space, time and space, frequency or frequency band, etc. is quantized at discrete samples to fall within a quantization bin corresponding to the reference signal values to be encoded in those samples. In this example, the reference signal comprises the sequence 1101001, and is repeated in the host signal features of the block being encoded.

The reference signal does not have to be represented as a binary sequence. For example, if the implementer wants the reference signal to vary smoothly over time or space, he can choose a larger symbol alphabet, where each symbol has a corresponding quantizer. Each of these quantizers can be represented as another quantizer axes in FIG. 2.

Figure 3:
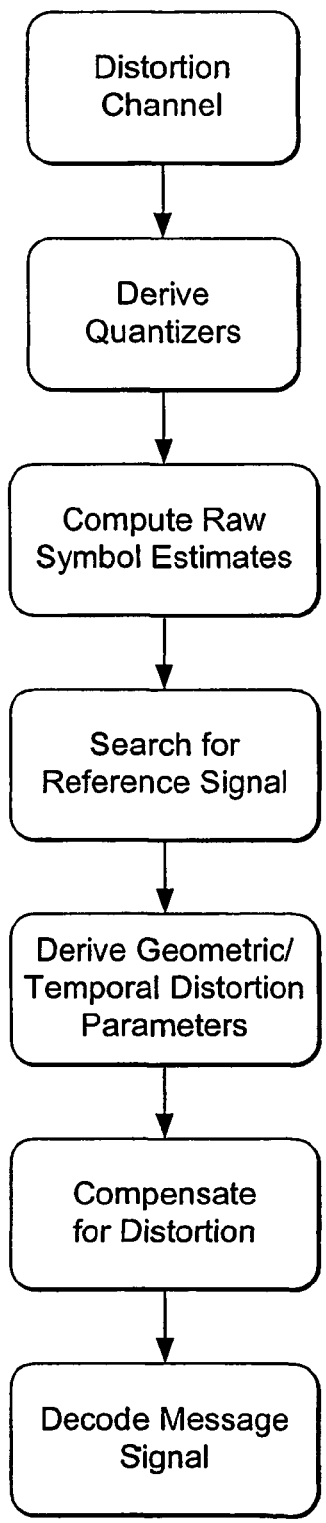
FIG. 3 is a diagram of a quantization type steganographic reader that uses the hidden reference signal to synchronize reading operations.

FIG. 3 is a diagram illustrating an auxiliary data reader that uses the reference signal to compensate for geometric/temporal distortions in an embedded media signal. The embedded media signal is received from a distortion channel, sampled and segmented into blocks. The distortion channel imposes geometric and/or temporal distortions on the embedded media signal.

First, the reader derives the quantizers for the embedded media signal. In an embodiment for images, the reader performs a statistical analysis of the watermarked feature samples to produce a statistical distribution of the samples from which quantization bins can be estimated. In particular, it creates a histogram for a block of sampled image data, such as the one shown in FIG. 4. The histogram assigns image feature samples to bins based on their values. The spacing between the bins provides an approximate spacing for the bins of the quantizers of the symbols used to encode the reference signal. It is not yet clear which quantizer corresponds to which binary symbols.

As noted above, the relative distance between bins in the embedder is delta/2. Due to the distortion of the watermarked signal, the distance between bins is now alpha*(delta/2), where alpha is a factor that represents the scaling of the watermarked signal due to distortion.

Based on an analysis of the histogram, the reader assumes a first assignment of quantizer to symbol, and then applies the quantizers to the samples to get raw estimates of the embedded symbols. It then searches for the reference signal in the output of the quantizers. In particular, it correlates the reference signal with the signal formed by the raw estimates to detect the presence of the reference signal in the embedded media signal.

As a specific example for images, consider the case where the reference signal forms peaks in the Fourier magnitude domain. The reader performs an FFT on the image formed by the raw estimates to get Fourier magnitude data and then transforms the data to log polar coordinates. The reader correlates the transformed data in the log polar space with a log polar representation of the reference signal. The location of maximum correlation provides an estimate of scale and rotation.

In a general case, if the correlation peak is not greater than a threshold, such as an absolute threshold or a threshold relative to the next highest peak, then the reader tries the alternative quantizer symbol assignment. If neither quantizer assignments yield an acceptable amount of correlation with the reference signal, then the reader considers embedded data not to be present. In the special case where the difference between one quantizer assignment and another is a phase shift, then a correlation process need not be executed for each possible quantizer assignment because the correlation is performed in the Fourier magnitude domain, where phase information is not used.

If the reference signal is deemed to be present, the reader uses the rotation and spatial scale distortion parameters to realign the image block. A process of correlation-based matched filtering can be used, along with knowledge of the embedded reference signal phases, to estimate the translation distortion undergone by the embedded image. The quantizers used to encode the message symbols are then used to decode the embedded message signal. As noted, this may include generating raw symbol estimates for samples in the block and then performing error correction decoding to recover the message signal.

A similar approach may be used for audio signals. Consider an example where the reference signal is a pseudorandom number (PN) sequence of binary symbols. The reader uses the derived quantizers to convert the audio block to raw symbol estimates. It then correlates the PN sequence with the raw symbol estimates to determine whether the reference signal is present in the media signal. The reference signal has peaks in the frequency domain to ascertain time scale. In particular, the signal formed from the raw estimates is transformed into a frequency domain. If the reference signal is present, there should be tell-tale peaks, which could be shifted due to time scale modifications (time scale modification, linear speed increases/decreases). The position of the peaks relative to the reference peaks provides an estimate of the time scaling distortion. Then any time-shift distortion may be estimated by correlating the reference signal to the (re-scaled) media signal. The reader uses this estimate to re-align the audio data and then applies the quantizers used for message symbols to extract the message signal.

The above examples refer to quantizing image sample or audio sample features to encode a reference signal and a message signal. The reference and message signal may be encoded in different feature samples, temporal/spatial resolutions, frequency bands, etc. For example, the reference signal may be encoded in time domain samples at a particular sampling rate for audio, or spatial domain samples at a particular sampling rate for images (still and video). The message signal, on the other hand, may be encoded in other transform domain samples, such as subbands, wavelet coefficients, DCT coefficients, DFT coefficients, a log polar or log-log coordinate system mapped from a time-frequency spectrogram, frequency domain, temporal domain, or spatial domain, etc. The reference and message signals can be encoded in any of a variety of domains created by transforming the signal from its perceptual domain to another transform domain. This new domain may represent features of host signal, such as power, autocorrelation, energy, phase, etc. that are particularly robust to expected forms of distortion, yet enable the embedded data to remain imperceptible in the perceptual domain of the watermarked signal. Preferably, the transform domain for encoding the reference and message signals should be selected so that the quantized features are relatively invariant or robust to expected forms of distortion for the application of the watermarking system.

Synchronization Using Curve Fitting

This section describes a method for elliptical curve fitting and related applications. One application is to compute affine transform parameters that describe geometric transformation to an image. In particular, this approach inserts a circular pattern (or multiple circular patterns) into an image, and after the image undergoes geometric transformation distorting the circle, the elliptical curve fitting technique fits the distorted circle to an ellipse and derives the affine transform parameters that characterize the distortion. These parameters may then be used to reverse the distortion and return the image to its original geometric state. This particular method may be used in digital watermarking applications, where a watermark encoder embeds the circular pattern in a manner that makes it imperceptible or substantially imperceptible to a viewer of the image. A watermark decoder then recovers elements of the circular pattern, fits them to an ellipse and derives the affine transform parameters.

A circle in a plane has the property that any affine transformation applied to the plane will transform the circle into an ellipse. A linear transformation (i.e., without translation) applied to the circle centered at the origin will transform it into an ellipse also centered at the origin. Another property of a circle pattern is that it is rotationally invariant. The advantage of this property is that estimation of rotation can be delayed until the rest of the affine parameters (scale, differential scale and shear) have been estimated.

An equation of a circle in a plane is, $$x^2 + y^2 = r^2 \qquad (1)$$

where, $r$ is the radius of the circle.

Applying an affine transformation (with zero translation) to the circle can be represented by a change in the coordinate system $$\begin{bmatrix} x \\ y \end{bmatrix} = \begin{bmatrix} c_1 & c_2 \\ c_3 & c_4 \end{bmatrix} \begin{bmatrix} x' \\ y' \end{bmatrix} \qquad (2)$$

The parameters $c_i$ determine the affine transformation.

Substituting the expressions for x and y from Equation 2 into Equation 1, and simplifying, one gets the equation $$\frac{x'^2}{\left(\frac{r^2}{c_1+c_3}\right)} + \left(\frac{c_1 c_2 + c_3 c_4}{r^2}\right) x' y' + \frac{y'^2}{\left(\frac{r^2}{c_2+c_4}\right)} = 1 \qquad (3)$$

which is the geometrical equation of an ellipse. This ellipse is centered at the origin and the major axis angle of the ellipse makes an arbitrary angle with the X-axis of the new coordinate system.

Figure 5:
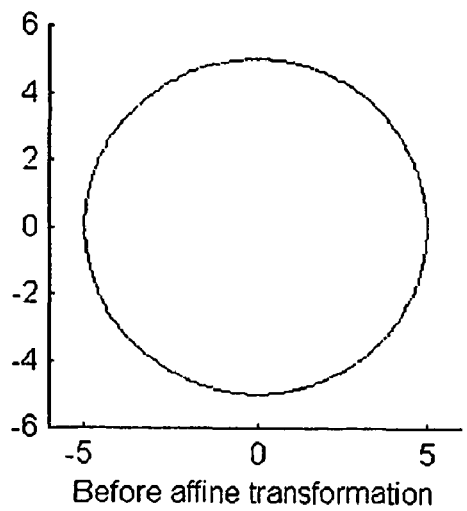
FIG. 5 illustrates an affine transformation of a circle in a plane into an arbitrary ellipse.
Figure 5:
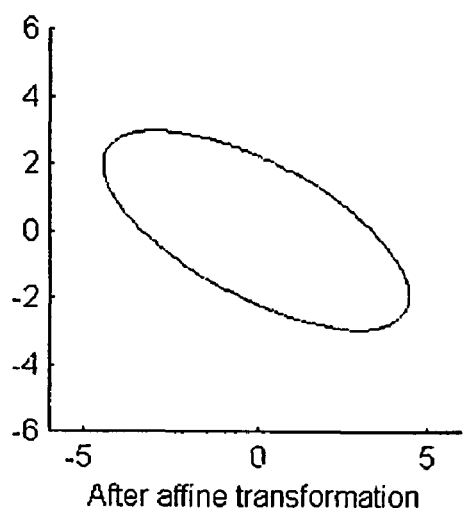

FIG. 5 illustrates an affine transformation of a circle in a plane into an arbitrary ellipse. An automated software or hardware detector can compute the affine transform from knowledge of the parameters of the circle (radius) before applying the transformation and knowledge of the parameters of the ellipse (major axis, minor axis, major axis rotation) after applying the transformation.

The following sections illustrate such a method for computing in the context of a digital image watermark embedder and reader.

Embedder

Figure 6:
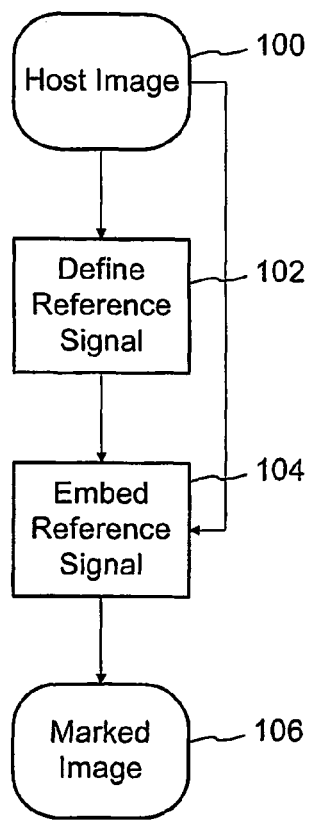
FIG. 6 is a flow diagram illustrating an example of a watermark embedder that embeds a substantially imperceptible circular reference signal into a host image.

FIG. 6 is a flow diagram illustrating an example of a watermark embedder that embeds a substantially imperceptible circular reference signal into a host image. The embedder starts with a host image 100. The embedder defines a reference signal to be embedded into the image so that the reference signal is substantially imperceptible or imperceptible (102). This reference signal is typically pre-defined, but it may also be adapted to the host image or to an auxiliary message (such as an N bit binary or M-ary code) to be embedded into the image.

The reference signal is comprised of elements that form a circle in a particular domain, such as the spatial image domain, the spatial frequency domain, or some other transform domain. For the sake of an example, consider a case where the elements are impulse or delta functions in the Fourier magnitude domain. The reference signal comprises impulse functions located at points on a circle centered at the origin of the Fourier transform magnitude. The points are randomly scattered along the circle, while preserving conjugate symmetry of the Fourier transform. The magnitudes of the points are determined by visibility and detection considerations. To obscure these points in the spatial domain and facilitate detection, they have known pseudorandom phase with respect to each other. The pseudorandom phase is designed to minimize visibility in the spatial domain.

In this implementation, the definition of the reference signal only specifies that the points should lie on a circle in the Fourier magnitude domain. For this circular grid, the choice of the radius of the circle and the distribution of the points along the circle are application specific. For example, in applications dealing with high resolution images, the radius can be chosen to be large such that points are in higher frequencies and visibility in the spatial domain is low. For a typical application, the radius could be in the mid-frequency range to achieve a balance between visibility requirements and signal-to-noise ratio considerations.

The distribution of points along the circle can be random or based on a quadrant or octant symmetry as needed by the application. Points on the circle should be selected such that they are as close to the integer lattice as possible. This will reduce the errors during the ellipse fitting and estimation process required for determining the affine transform parameters.

Figure 7:
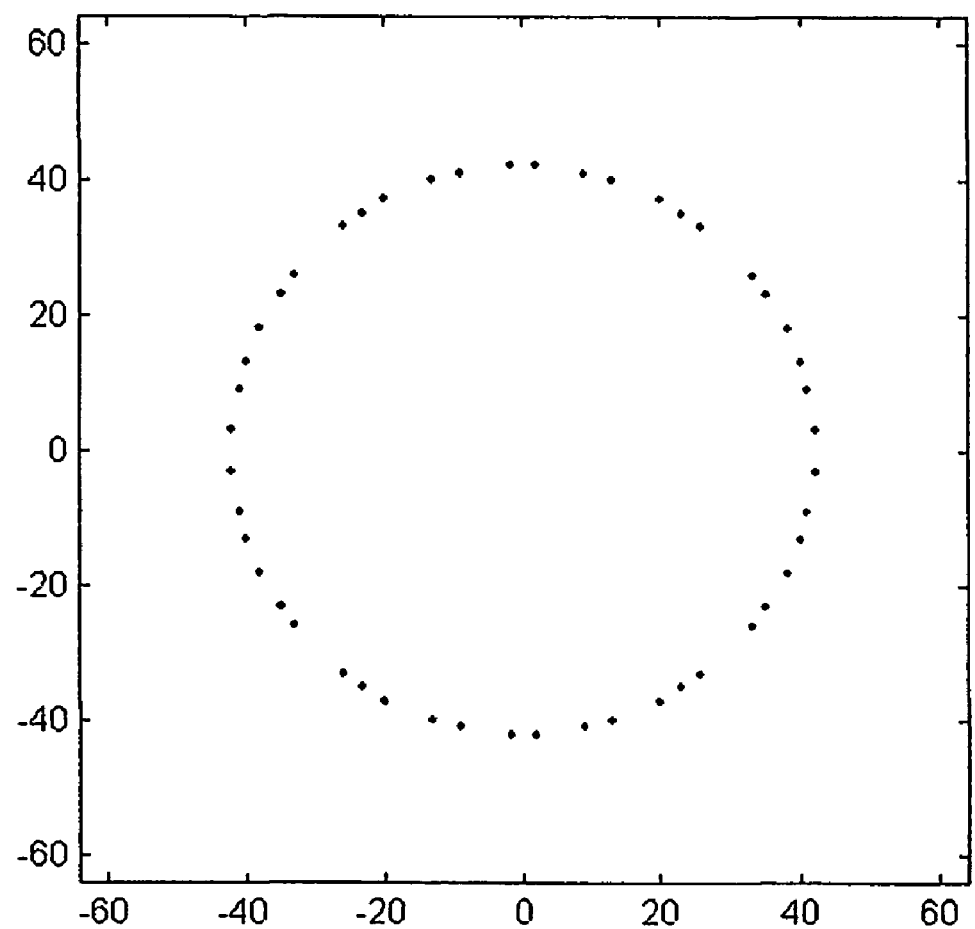
FIG. 7 is a flow diagram illustrating an example of a circular reference signal in the Fourier magnitude domain.

For this particular approach, it may be more advantageous to have fewer points with higher energy than to have several grid points with lower energy. Higher energy points will be easier to locate and isolate in the Fourier magnitude domain of a watermarked image. FIG. 7 illustrates an example of a circular reference signal in the Fourier magnitude domain.

The embedder embeds the reference signal into the image (104). One way to embed the reference signal is to add it to the host image in the spatial image domain, or in the Fourier domain. To reduce the perceptibility of the reference signal, the samples of the signal in the spatial or spatial frequency domain may be perceptually adapted to the hiding characteristics of the host image. For example, the samples may be multiplied by corresponding elements in a gain vector whose elements are functions of the signal activity in a local neighborhood of samples around those being modified by the embedding of the reference signal. The greater the signal activity (e.g., busyness or texture), the better the data hiding characteristics of the image. Preferably for digital watermarking applications where perceptibility is a design constraint, the gain vector elements are a function of sensitivity to the human perceptual system. The lower the sensitivity, the higher the gain.

Another way to embed the reference signal is to quantize sample values in the image according to an embedding function that defines how elements in the reference signal are to be mapped quantization levels or quantizers. For example, the presence of a reference signal element may be set at one quantizer or set of quantization levels, and the absence of a reference signal element may be set to a second quantizer or set of quantization levels. This embedding may be performed using scalar quantizers on spatial domain samples, for example. To encode the reference signal, a sample or group of samples at a particular element in a circular pattern are quantized using a first quantizer. The other samples are quantized using a second quantizer.

Regardless of the specifics of the embedding process, the result is a marked image (106) carrying the reference signal in the form of a circular pattern. The embedding process may be repeated in discrete blocks of the image. For example, the image may be tiled into 256 by 256 pixel blocks at particular resolution, like 300 or 600 dpi, and the embedder may embed the reference signal into each tile.

Detector

Figure 8:
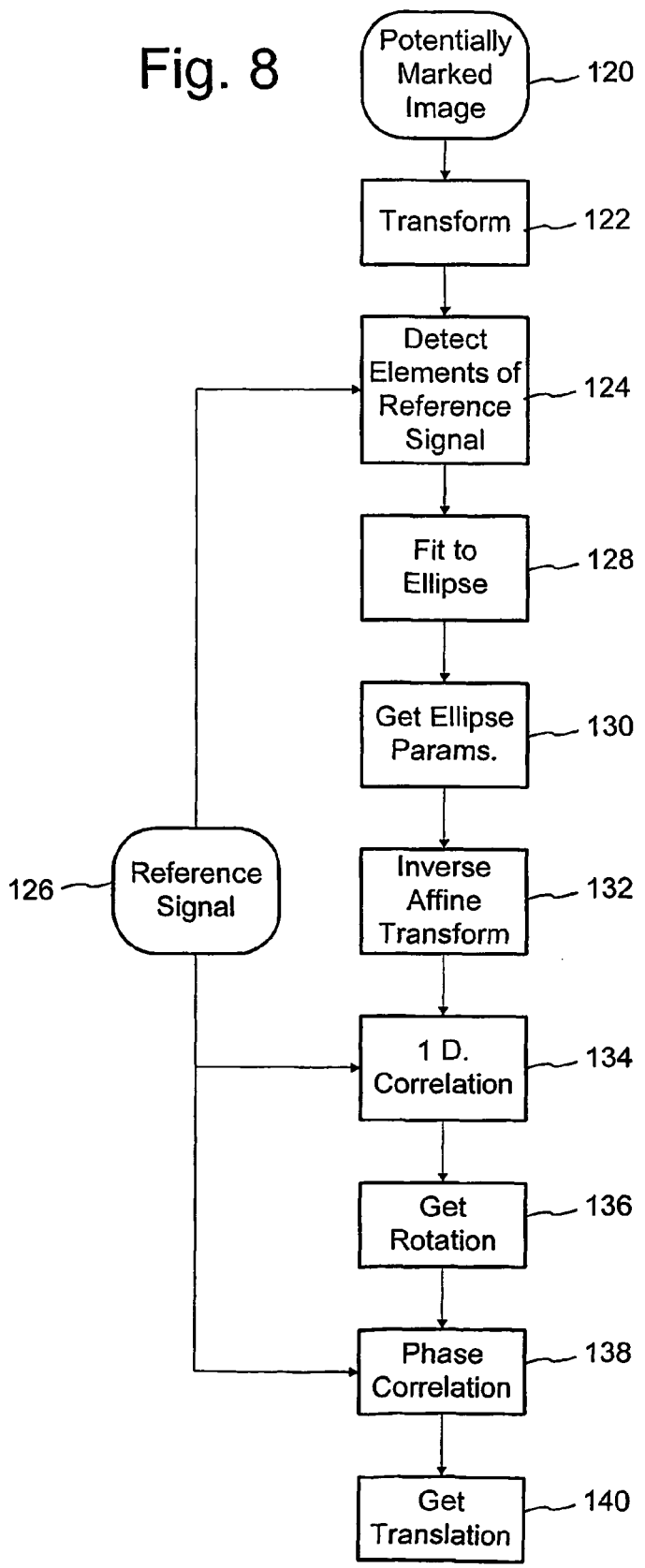
FIG. 8 is a flow diagram illustrating a detector compatible with the embedder of FIG. 6.

FIG. 8 is a flow diagram illustrating a detector compatible with the embedder of FIG. 6. The detector receives a potentially marked image 120, for example, by scanning an image of a printed object suspected of having a marked image. The scanning process, along with other image processes, typically introduce some geometric distortion represented as an affine transform, or at least locally affine (e.g., piece wise linear geometric distortion).

For the sake of illustration, consider the case where the embedder inserted the reference signal as a circular pattern of impulse functions in the Fourier magnitude domain. In this case, the detector transforms the image into the Fourier magnitude domain (122). Of course, if the embedder defines the circular pattern in some other domain, the detector transforms the image into that domain.

Next, the detector detects elements of the reference signal by identifying the highest magnitude impulse signals in the transform domain (124). This process may include one or more pre-processing steps to enhance detection of the circular elements and differentiate them from the host image. Examples of these steps include summing blocks of the image and filtering the samples in the image to de-correlate the reference signal from the host image. Blocks may be summed in a transform domain, such as the Fourier domain, depending on the domain in which the reference pattern is embedded. For example, if the circular pattern is in the Fourier magnitude domain, the detector may sum blocks in the Fourier magnitude domain. The detector knows the characteristics of the reference signal (126), such as the frequencies, number, and location of the elements in the circular pattern. It uses this criteria to pre-process the image and identify candidate points in the pattern.

First, a filter is used to de-correlate the reference signal from the host image. The detector applies this filter to the image and then computes the Fourier magnitude of the resulting image. The filter helps in accentuating reference signal points.

One example of this type of de-correlating filter operates as follows. For each image sample, it compares the sample with each of its eight neighboring image samples. The filter replaces the value at the center sample with a value that is incremented each time the center sample value is greater than a neighbor value and decremented each time the center sample is less than the neighbor value. In particular, for each comparison, the filter increments by a value of 1 if the center sample is greater than its neighbor, it increments by a value of −1 if the center sample is less than its neighbor, and makes no change otherwise. The output of the filter will be between −8 and +8 when an eight neighborhood (3 by 3 sample region) is used in the filter implementation. Such type of a filter has a number of applications such as edge detection, signal enhancement, etc. in signal processing and operates on different media types (image, video and audio) and samples in various domains. For digital watermark applications, it may be used to estimate the original host signal and watermark signal, where the watermark signal is applied as an additive, antipodal PN signal.

The filter discussed in the previous paragraph may be implemented in variety of ways. One particular implementation makes comparisons between the center sample and each neighboring sample, and transforms the result of this comparison to an increment or decrement value (e.g., +k or −k, where k is a constant like 1, 2, 3, etc.). The filter sums each of the increment/decrement values from each neighbor, and then replaces the center sample value with the result of the summation. This type of filter can be implemented efficiently using a look up table. For example, the comparison operation is performed by subtracting the center sample value from a neighbor sample value to produce a difference value (−255 to +255 for an 8 bit sample). The result is then fed to a look-up table, which maps the difference value to an increment/decrement value and outputs that value. The filter sums the look-up table output for each neighbor in the neighborhood, and replaces the center sample with the result of the summation. This neighborhood may be the eight neighbors in 3 by 3 block of samples, the adjacent samples in a one-dimensional signal, the horizontally and/or vertically adjacent neighbors in a two or more dimensional signal, etc. The size of the neighborhood may be increased as well. The look-up table may be used to implement a variety of non-linear filters efficiently.

In this implementation, reference signal detection comprises extracting peaks from the Fourier magnitude data. There are numerous approaches for peak detection and extraction. For example, one could isolate points with high energy relative to the average energy in the Fourier magnitude plane. Alternatively, one could isolate points with high energy in a small local region. Statistical measures such as the mean, median, variance, etc. are usually employed to reliably detect peaks. One example of a peak detection and extraction strategy is described by Nicolas Devillard. See N. Devillard, "Infrared jitter imaging data reduction algorithms", Jun. 21, 1999, which is hereby incorporated by reference. A copy of this paper is attached.

After the de-correlation process, the detector proceeds with peak extraction as follows. Let $\mu$ be the mean of all values in the Fourier magnitude plane. Let $\sigma$ be the average absolute deviation from the median. A binary image the same size as the Fourier magnitude plane is created by assigning one to all pixels which have a value above $T=\mu+k\sigma$ and zero to all other pixels. k is an adjustable parameter that depends upon the amount of noise. In our implementation a value of k=10 was used. The threshold T is repeatedly reduced by a factor of $k\sigma/100$ until the number of peaks found is just greater than N, where N is the number of points in the circular reference signal pattern. The non-zero points in the binary image are the extracted peaks.

The detector then fits the extracted peaks to an ellipse (128). The particular method is a variation of the least squares approach described by Fitzgibbon et al. See, A. Fitzgibbon, M. Pilu, R. Fisher "Direct least-square fitting of Ellipses", International Conference on Pattern Recognition, Vienna, August 1996; Extended version available as DAI Research Paper #794; and M. Pilu, A. Fitzgibbon, R. Fisher "Ellipse-specific Direct least-square Fitting", IEEE International Conference on Image Processing, Lausanne, September 1996, which are hereby incorporated by reference. For this approach, it is beneficial to reflect the extracted points over the entire Fourier magnitude plane, taking care of the conjugate symmetry. Reflecting the points before feeding them to the ellipse fitting algorithm will ensure a better least squares ellipse fit. Note that reflection is not a necessary condition, the approach could also be applied to points located in a portion (e.g. half plane or quarter plane) of the Fourier domain. Copies of these papers are attached.

The ellipse fitting procedure in this implementation is based on the least squares ellipse-fitting technique proposed by Fitzgibbon et al. This technique uses a direct least squares method to fit an ellipse to a set of data points in a plane. The technique is based on using the singular value decomposition to minimize the algebraic distance between an ellipse and the data points subject to elliptical constraints. The solution is non-recursive and always yields an ellipse.

Once the detector has found the ellipse, it derives the parameters of the ellipse (130). From these parameters, the detector derives affine transform parameters that represent the distortion between the reference circle and the distorted reference circle (i.e. the ellipse) found in the potentially marked image.

The equation of the ellipse is specified in terms of the affine parameters and the radius of the circle (which is known, since the reference signal was based on it). Till this stage, the detector ignores the rotation of the points. The detector knows that the points lie on the fitted ellipse, but does not know where they lie with respect to the original reference signal. A partial affine transformation can be computed from the parameters of the fitted ellipse. We call this transformation partial since it does not include the effects of rotation. Next, the detector performs an inverse geometric transform of the candidate points into the shape of a circle (132). The detector applies an inverse affine transform to the image such that the fitted ellipse in the Fourier magnitude domain is converted into a circle with the same radius as the radius of the reference signal.

The detector then recovers the rotation angle parameter. In one approach for getting rotation, the detector samples along the detected circle, and performs a one dimensional correlation (134) to find the rotation angle. In particular, the detector samples the Fourier magnitude along this circle to obtain a sampled 1-dimensional signal. This 1-D signal contains peaks corresponding to the reference signal points. The detector gets the rotation angle (136) by a 1-D correlation between this signal and the 1-D signal corresponding to the reference signal Fourier magnitude sampled along the reference signal circle. The detector computes the rotation angle from the correlation peak offset.

Alternatively, rotation can be recovered using a Fourier-Mellin procedure in the log-polar domain. For this approach, the partial affine transform estimated from the ellipse is inverted and applied to the frequency domain data so that the extracted points lie on a circle but are rotated with respect to the reference signal. Rotation is recovered through correlation in the log-polar domain. The estimated rotation, along with the partial affine parameters estimated from the ellipse are then combined to give the full affine transform parameters.

Having determined these affine parameters, the detector may use these parameters to correct for differential scale and rotation in the spatial domain or some other domain, and then perform additional stages to get other parameters, such as translation. In particular, the detector may perform phase correlation (138) (e.g., phase only match filtering) between the reference signal and the marked signal, corrected for scale, shear and rotation distortion. The coordinates of highest correlation provide the translation parameters (140).

In the case where the watermark embedder inserts the reference signal using quantization modulation as described above, the detector first performs a quantization to convert image samples into a binary image representing the presence or absence of the reference signal. The detector then fits the detected reference signal to an ellipse, and derives the affine parameters as described above.

Images having the reference signal can undergo severe degradation due to image manipulations or noise. Such degradation can adversely affect the estimation of the affine parameters. Noise or degradations can cause spurious peaks to appear in the Fourier magnitude domain. The ellipse-fitting technique of Fitzgibbon et al. is substantially affected by spurious points that are not on the ellipse. Even a few spurious points can alter the ellipse-fitting result to such an extent that the resulting affine parameters are not accurate enough for successful watermark detection and decoding.

Figure 4:
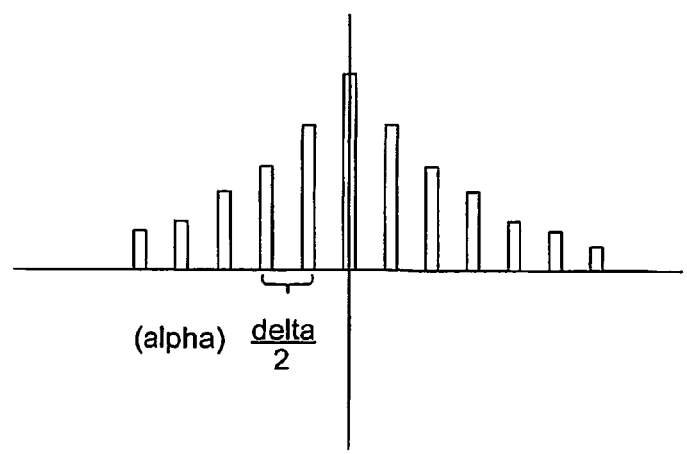
FIG. 4 is a diagram of a histogram used to estimate quantizers from a distorted or corrupted media signal suspected of being embedded with hidden data by a quantization type steganographic embedder.

There are a number of potential enhancements to the method described above. To improve the method, one implementation discards outliers in the ellipse fitting process as follows:

1. start with $N_i$ reference point candidates detected in stage 124 of FIG. 4;

2. get the best ellipse fit for the $N_i$ points; this is ellipse $E_i$;

3. compute distance from each point to $E_i$;

4. sort $N_i$ points by distance from $E_i$ in descending order;

5. discard point that is at the maximum distance from the ellipse $E_i$;

6. if the difference between the ellipse fit at the previous iteration and the current iteration is less than $\epsilon$, go to Step 9

7. $N_{i+1} = N_i - 1$ 8. increment i; i=i+1

9. go to Step 2 for next iteration 10. stop

Another modification to this approach includes using knowledge of the reference signal to discard points that are highly unlikely to be part of the reference signal.

An initial implementation of the above method uses 12 reference points in a quarter plane of the Fourier magnitude space. The embedder subdivides the image into 128 by 128 blocks and transforms the blocks into a 128 by 128 Fourier magnitude space. As a further enhancement, each of the N points extracted in stage 124 may be assigned a weight according to their magnitude value and location in the Fourier transform domain. These weights could then be incorporated within the ellipse fitting procedure to improve both the robustness as well as the accuracy of the fit.

As a further enhancement, the reference signal may be designed to carry auxiliary, hidden information. For example, each reference point may correspond to a message value. A particular sequence of reference points at a particular distance from each other on the reference circle may be used to signal a start of a message. Then, the remaining reference points can be used to carry multiple bits of information. For example, the presence of reference points at particular locations may correspond to binary values. Error correction coding and decoding may be used to encode the message symbols and decode the message symbols. Multiple circles may be encoded into the content by tiling the circles in blocks of image data (e.g., putting a circle in each block).

Further, information may be encoded by representing different messages using different arrangements of circles.

As a further enhancement, each tile of the watermark signal could contain a unique arrangement of points along a circle, with the radius of the circle being constant in all tiles.

As a further enhancement, the reference signal may be used as an indicator of another watermark signal, or even convey key information, specifying how or where to decode another watermark signal. For example, the reference signal may be used as a calibration signal that enables the detector to determine the affine transform parameters, correct for the distortion, and then decode a message signal from the image data (e.g., a spatial or frequency domain watermark message signal).

The reference signal may be used in video signals in a similar fashion. For example, the reference signal may be encoded into the spatial domain or spatial frequency domain of selected frames. Also, the reference circle may be encoded in the time-frequency spectrogram of an audio signal.

Locally Adaptive Embedding and Reading Using Quantization

In this section, we describe a digital watermarking method that locally adapts quantization bins based on local characteristics of the host signal. These quantization bins correspond to auxiliary data symbols. To hide an auxiliary data symbol in a host media signal, the embedder alters the value of a characteristic of the host signal such that its value falls within a bin corresponding to the auxiliary data symbol to be encoded. To extract the hidden data symbol, a reader re-computes the quantization bins based on local characteristics of the host signal, maps the characteristic values at particular embedding locations to the locally adapted bins to determine the bin, and then returns the symbol corresponding to that bin. While our examples specifically describe a process for image or video signals, the technique applies to other media types like audio signals.

Figure 9:
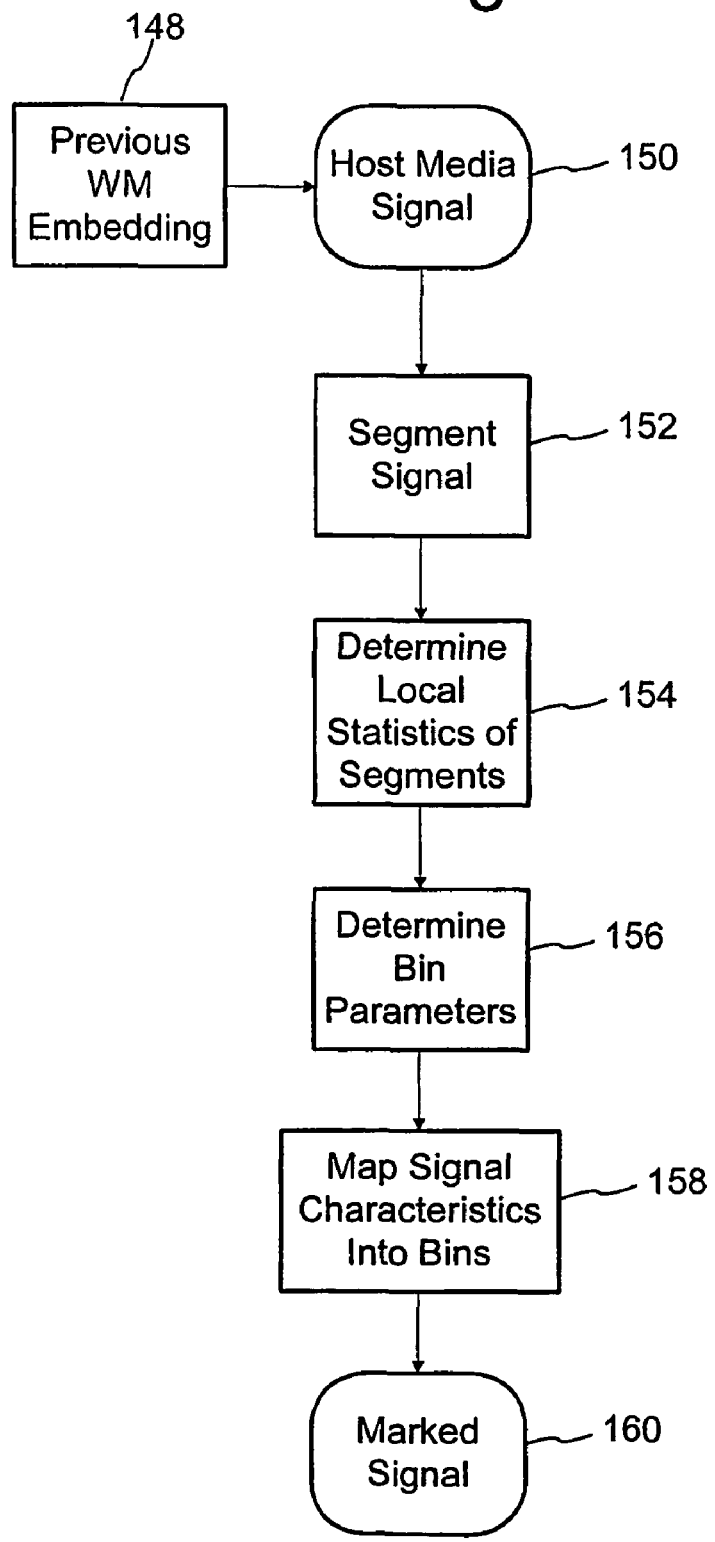
FIG. 9 is a flow diagram illustrating a quantization based embedding scheme where the quantization bins are locally adapted to host signal characteristics.

FIG. 9 illustrates a flow diagram of a quantization based embedding scheme where the quantization bins are locally adapted to host signal characteristics. As we will explain further, our implementation uses a separate watermark to provide additional functionality. As such, the process starts with an initial watermark embedding operation to embed a first watermark signal as shown in block 148. This procedure produces our host media signal 150, which serves as input to the quantization-based embedder.

This embedder begins by segmenting the media signal into blocks (152). These blocks may have a regular or arbitrary shape. In the former case, the media signal may be divided into contiguous blocks of a predetermined dimension. For example, one of our implementations segments spatial domain pixels of an image signal into rectangular blocks.

In the latter case, a segmentation routine may be used to identify regions in the media signal having particular characteristics. For example, the routine may segment noisy from smooth regions or tonal from non-tonal segments. It may segment regions based on similarity of feature values using watershed or morphological segmentation routines, such as those described in co-pending patent application Ser. No. 09/940,872, which is hereby incorporated by reference. One example of a suitable segmentation process is watershed segmentation. See, for example Luc Vincent and Pierre Soille, "Watersheds in Digital Spaces: An efficient Algorithm Based on Immersion Simulations," IEEE Trans. PAMI, Vol 13 No 6, June 1991; and Kari Saarinen, "Watersheds in Color Image Segmentation," IEEE Workshop on Nonlinear Signal and Image Processing (NSIP), Halkidiki, Greece, June 1995, which are hereby incorporated by reference.

Other segmentation approaches may be used as well. Segmentation methods fall into 3 categories, (1) characteristic feature thresholding or clustering, (2) edge detection, and (3) region extraction. See K. S. Fu and J. K. Mui, "A Survey on Image Segmentation," Pattern Recognition, Vol 13, pp 3-16, 1981, which is hereby incorporated by reference. Also, within these methods, many techniques can be employed to compute the quantities used in the methods, e.g., statistics, edge filters, morphological filters, Markov random fields (MRF), fuzzy set theory, and neural nets. See Robert Haralick and Linda Shapiro, "Survey: Image Segmentation Techniques," Computer vision, graphics, and image processing, Vol 29, pp 100-132, 1985, which is hereby incorporated by reference.

For images, we recommend use of the watershed algorithm, which falls into the clustering segmentation category due to the inherent robustness we have seen with respect to typical noise and distortion processes for imagery. However, other segmentation methods could be employed for computational or robustness reasons with similar results. Furthermore, these segmentation techniques can be combined or layered for additional robustness in specific applications.

One potential advantage is that the host signal characteristics selected for quantization-based embedding can be chosen based on the characteristics of each region. In this case, the region is mapped into a domain comprising an array of characteristic values for that region. The quantization bins are adapted to the characteristic values of that region. Also, the quantization function parameters, such as the bin sizes and spacing, may be selected based on those characteristics. The quantization bin spacing, for example, may be represented as a non-linear function of the characteristic values of the host signal (e.g., logarithmic).

One benefit of selecting the signal characteristic for embedding based on the characteristics of the region is that the data hiding can be optimized for increased robustness and/or reduced perceptibility based on those characteristics. For example, a first type of quantization function may be used to establish the bins for a noisy region, while a second type of quantization function may be used to establish the bins for a smooth region.

Another potential advantage is that the host signal characteristics and the quantization function that defines the bin structure can be selected based on the distortion channel through which the watermarked signal is expected to travel. For a robust watermark application, the quantization-based watermark is designed to survive the distortion channel for that channel. As such, the signal characteristics and quantization function are selected to survive that channel. Examples of the distortion channel include printing and scanning, compression, digital to analog conversion (and analog to digital conversion), format changes, re-sampling, geometric distortion (including temporal distortions like time scaling), etc.

After segmenting the signal, the embedder determines local statistics of the characteristic values in each segment to be used in hiding auxiliary data (154). Continuing with our example of an image segmented into rectangular blocks, the embedder determines order statistics of selected pixels in each block, such as the minimum, maximum, and median value. From these order statistics, the embedder defines the bin parameters, namely the bin size and spacing. These parameters may be specified in part by a quantization function, which defines quantization bins as a function of the host signal characteristic being modified to hide auxiliary data.

Figure 10:
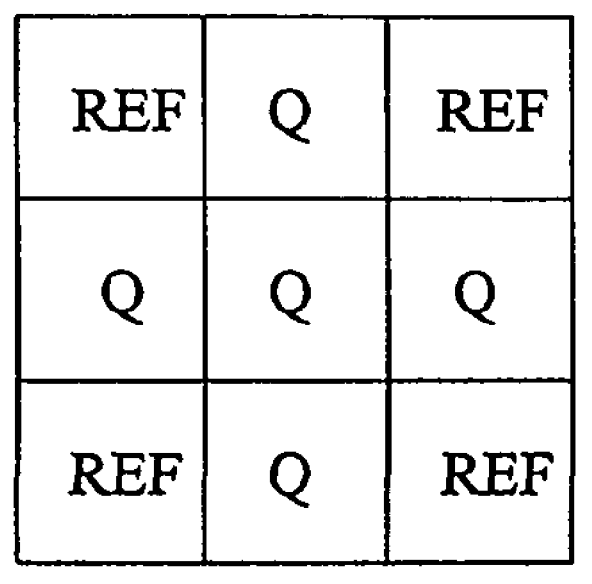

FIG. 10 shows an example of an image segment comprised of a three by three pixel region. In this example, an image is segmented into contiguous regions like the one depicted in FIG. 10. Each pixel location in the region is either a reference pixel or target pixel to be quantized into a bin to hide auxiliary data. The embedder uses the reference pixel values to compute the local characteristics, such as the minimum and maximum values as well as the median or average. It then sets the quantization bin size as function of the statistics: e.g.,: K(Max−Min), where K is a constant, and Max and Min are the maximum and minimum values of the reference pixels in the region. The median or average may be used to set the quantizer offset. This is just one example; there are many ways to select the quantization function used to establish the bins, including non-linear or linear quantization functions, functions selected based on the region characteristics, etc. Preferably, the reference values, statistics, and quantization function should be selected such that the quantization bins are substantially invariant to the expected distortions of the channel.

While our illustrated scheme employs separate reference and quantization embedding locations, these locations may overlap in some implementations. Depending on the region size, choice of host signal characteristics for embedding, and the quantization function, the reference locations used to compute the statistics may be the same as or at least overlap the embedding locations. The embedding and reference locations may correspond to groups of samples of the host signal that are mutually exclusive yet interleaved as shown, that are partially overlap, or that substantially overlap.

The reference locations may be used to embed a different watermark, such as a detection, calibration, variable message or synchronization watermark. We alluded to this type of digital watermark above with reference to block 148 in FIG. 9. These types of watermarks may be distinct or one in the same. Again, the embedding locations of the separate watermark and the quantization-based watermark may be mutually exclusive, overlap partially, or substantially overlap. We provide specific examples of this separate watermark in the discussion of the reader below.

Returning to FIG. 9, the embedder proceeds to embed auxiliary data symbols by adjusting the characteristic value of an embedding location so that it falls within a quantization bin associated with the symbol to be encoded (158). Each embedding location may encode one auxiliary binary data symbol. Alternatively, groups of embedding locations may correspond to an M-ary symbol in a vector quantization scheme. For example, the block in FIG. 10 has five embedding locations labeled Q. The characteristics of these five embedding locations can be adjusted such that they fall into one of M different bin sets, each bin set corresponding to a particular M-ary symbol. Further, the auxiliary data symbols are preferably error correction encoded prior to embedding into the host signal. The result of the quantization based embedding operation is a marked signal (160).

The marked signal passes through a channel for a particular application, and ultimately arrives at a compatible reader. This channel is expected to have some types of distortion that increase the difficulty of accurately recovering the embedded auxiliary data.

Figure 11:
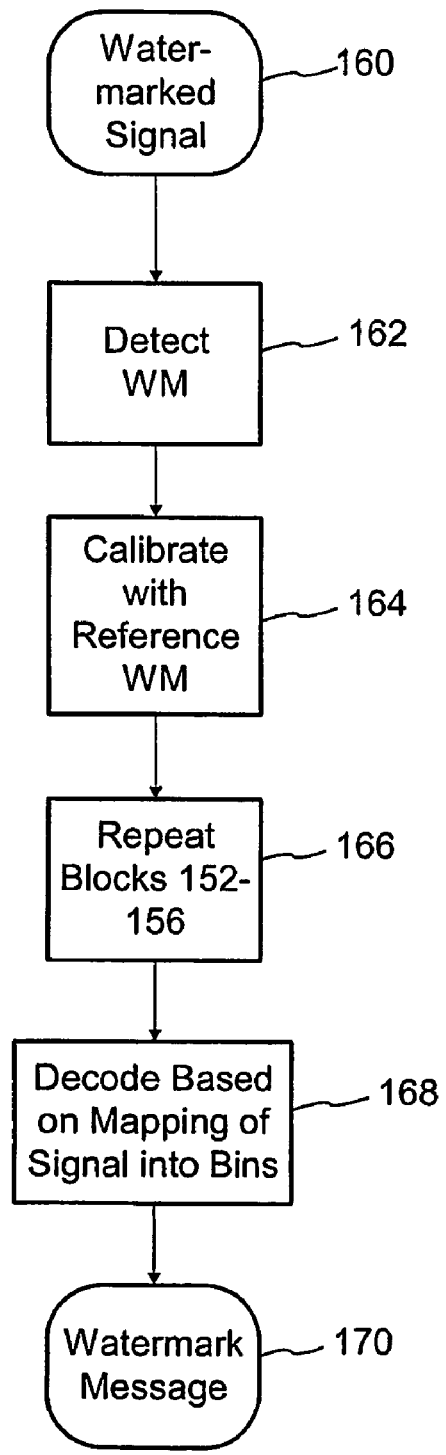
FIG. 11 illustrates a flow diagram of a hidden data reader compatible with the embedder of FIG. 9.

FIG. 11 illustrates a flow diagram of a reader compatible with the embedder of FIG. 9. The reader takes as input a watermarked signal 160. It then executes procedures to detect, calibrate and extract the hidden auxiliary data. First, the reader detects whether a digital watermark is present (162). This may be accomplished by detecting the presence of a detection watermark as noted above. Preferably this detection watermark is robust to distortions expected in the channel. For example, for image signal applications, the robust watermark is preferably robust to rotation and scale. One form of detection watermark is a hidden signal embedded in the Fourier Mellin domain, which is invariant to rotation and scale changes. This attribute enables the reader to identify the presence of a digital watermark. The detection watermark may be a separate watermark, or a watermark signal integrated with another watermark.

Having detected the presence of the digital watermark, the reader proceeds to calibrate the signal (164). In this calibration process, the reader uses attributes of the watermark signal (e.g., known signal components) to determine the origin and coordinate system of the watermark signal. This process is sometimes referred to as calibration or synchronization of the watermark, and may be performed with a reference, calibration, or synchronization watermark signal. This process enables the reader to identify the reference and embedding locations used in the quantization based embedding process. A separate watermark, such as the detection, reference, synchronization, or a calibration watermark, may be used to determine the origin and coordinate system. For images and video, the calibration process determines the translation, scale, rotation, and differential scale of the host signal relative to its original state at embedding using known attributes of the watermark signal to align the data in the received signal. For audio, the calibration process identifies the translation and time scaling. For some distortion channels, certain types of geometric distortion are not likely, so the calibration process can be simplified to merely finding the origin and/or geometric or temporal scaling. For example, rotation may not occur in certain video and audio applications. Thus, the watermark need not be robust to rotation distortion.

There are a number of ways to perform the calibration function. One such approach is to use the elliptical curve fitting method described in this document.

Another is to perform correlation detection with peaks of the watermark signal in the Fourier Mellin domain (or other domain, such as the Fourier domain, autocorrelation domain, etc.) to get rotation and scaling parameters, and then perform additional correlation to get translation parameters (e.g., the origin of a watermarked block). Such techniques are described in U.S. Pat. No. 6,122,403, or co-pending application Ser. No. 09/503,881, which are incorporated by reference.

Once the geometric distortion parameters are computed, the reader can align the received signal and evaluate the embedding locations in the aligned signal of the quantization based watermark.

Next, the reader repeats the processes performed in blocks 152-156 of the embedder to segment the aligned signal, compute the local statistics of each segment (e.g., optionally on the reference locations in the particular domain of quantization based embedding), and determine the quantization bin parameters (166). The reader then decodes the quantization based watermark signal by mapping the signal characteristics at the embedding locations into the re-computed quantization bins (168). The bins each correspond to one M-ary or binary symbol. Thus, by mapping the signal characteristics into the bins (e.g., applying the quantization function to the signal characteristic), the reader determines the symbol for each embedding location.

These symbols may have been error correction encoded, in which case, they are supplied to an error correction decoder to extract the hidden auxiliary data message.

One potential drawback for some quantization-based digital watermark embedding schemes is that they are not robust to gain or bias distortions. In other words, if a gain is applied to the watermarked signal, or if a bias signal is added to it, the signal characteristics that have been quantized to hide auxiliary data symbols may be altered such that they no longer correspond to the correct data symbols. By adapting the quantization function in this manner, the quantization-based digital watermark may be made more robust. Further, since the bin structure varies with the host image, it enables data to be hidden more securely.

Quantization Based Watermarks Combined with Other Watermarks

The quantization based embedding and reading method described above enables a number of possible applications. It may be used to embed information separate from another watermark in the same host media signal. One example is sync or calibration watermark described previously. The other digital watermark or watermarks may be embedded and extracted using techniques like direct sequence or frequency hopping spread spectrum.

Attributes of a first watermark embedded into the host media signal may be used to determine the quantization bins used to embed a second digital watermark. For example, a calibration signal comprised of signal peaks in the autocorrelation or Fourier magnitude domain may be used as a component of the first watermark. This watermark is perceptually adapted to the host signal based on its signal activity, variance, or local contrast, where greater signal activity yields more intensity in the first watermark signal. The statistics of this first watermark over a specified local region, such as its root means square, can be used to set the quantization bin sizes for the quantization based watermark embedded in a second watermark in that local region. As the RMS of the first watermark increases, so does the bin size of the quantization based watermark and its robustness.

Another type of digital watermark is one that is generated by spreading a message over pseudorandom number carrier sequence and adding the resulting signal to the host media signal with or without adapting it based on human perceptibility models. Such watermarks may be detected using correlation based detection techniques, where the received signal is correlated with the carrier sequence. The addition of such a watermark before embedding using the quantization based approach adds variability to the host signal, enabling the quantization based hidden data to be embedded more robustly.

Additional types of digital watermarks that may be embedded along with the quantization-based watermark are disclosed in assignee's U.S. Pat. No. 6,122,403 and other literature. Such digital watermark signals may carry a key to extract the quantization-based watermark. For example, the key may specify the embedding locations, the signal characteristics that have been quantized to encode hidden data, or the general form of the quantization function (the local statistics can then be used to identify the quantization bins within that general form with more particularity).

The quantization-based approach may be used for steganographic or data hiding applications, where the objective is to hide larger amounts of information. A first digital watermark is embedded using, for example, spread spectrum techniques and correlation based detection to increase robustness. This robust watermark carries a small payload, or no payload, and performs the function of a detection and/or calibration watermark signal. The quantization watermark carries additional data and provides a higher capacity hidden data channel for auxiliary information within the host media signal (e.g., video, still image or audio).

Another application for dual watermarks, including quantization based watermarks and other non-quantization watermarks is "metrology." Metrology refers to the science of measurement. In the context of the digital watermark, it refers to measurements of the digital watermark in a distorted host media signal to analyze the channel through which the host media signal has passed. These measurements can be used to specifically identify types of distortions or alterations to the host signal due to the channel to authenticate the signal or otherwise characterize the channel.

One authentication application for watermarked objects, such as value documents and identification cards, is to detect whether the object is a copy or an original based on the watermark measurements.

One specific framework for characterizing the channel distortion is as follows. The above quantization based watermark is used to embed a hidden message, which has been error correction encoded (e.g., using convolution codes or some other scheme like turbo or Reed Solomon codes). A programmatic watermark decoder function operates on the host signal after it has passed through a distortion channel (or model of that channel) and extracts raw, error correction coded messages by mapping characteristics to quantization bins. The decoder then reconstructs the original message by performing error correction decoding. It then reconstructs the original raw message symbols by performing a message coding on the extracted message. This message need not be fixed; it can and preferably does carry variable data payloads. Once the raw message symbols are reconstructed, the decoder computes error statistics by comparing the reconstructed raw message symbols with the ones identified by mapping the received signal characteristics to the quantization bins. When the detected raw symbol differs with the reconstructed symbol, it is identified as an error.

Error statistics may be maintained per bin, per region, and/or per signal characteristic. A training set of host media signals (such as images used on a secure document) can be used to characterize errors due to distortion channels. Based on this training set, the implementer can create a classifier that classifies distortion types (like scanning and printing or photocopying) based on the observed error statistics from the training set. The classifier can then be deployed in a programmatic authenticator that measures error statistics of the quantization based watermark signal and classifies the type of distortion (e.g., differentiates an original from a copy or multiple classes of copies).

A similar approach can be used to characterize a distortion channel and measure error statistics that provide a measure of quality of service, such as quality of service of network video or audio broadcasts.

One way to refine the sensitivity of the quantization-based watermark to certain forms of distortion is to adjust the bin sizes over the space of the signal characteristics being quantized so that they are more likely to generate raw symbol errors in particular bins in response to specific forms of distortion being detected. When a high number of errors are observed in those bins, then the resulting error measurement is an indicator of a particular type of distortion known to be associated with that error measurement.

In some applications, it is useful to embed a hash of the host signal in the digital watermark. The above quantization approach can be used to embed the hash of the host signal into the host signal. A robust hash refers to a hash that is not altered due to the embedding of the hash in the host media signal. In other words, the robust hash of the media signal is the same before and after embedding of the hash. Typically, the robust hash is derived from perceptually relevant features. To detect alteration of the host signal, the robust hash is extracted and compared with a newly computed hash of the received signal from which it is extracted. If these two hashes do not match, an alteration has occurred.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of embedding a digital watermark in a media signal comprising:
    embedding a first digital watermark in the media signal to produce a watermarked media signal;
    quantizing elements of the watermarked media signal to values corresponding to message symbols of a secondary digital watermark; wherein the first digital watermark is used to determine quantizing of elements for extracting the secondary digital watermark.

2. The method of claim 1 wherein statistics of the first digital watermark are used to adapt the quantizing of elements to embed the secondary watermark.

3. The method of claim 1 wherein the first digital watermark includes a direct sequence or frequency hopping spread spectrum digital watermark.

4. The method of claim 1 wherein the first watermark is generated by spreading a message over a carrier signal to produce a modified carrier and is embedded by adding the modified carrier to the media signal to produce the watermarked media signal.

5. The method of claim 1 wherein the first watermark carries a key to extract the secondary watermark.

6. The method of claim 5 wherein the key specifies watermark parameters used in quantizing the watermarked signal to embed the secondary watermark.

7. The method of claim 1 wherein the first digital watermark includes a reference signal having a circular pattern that is used to compensate for geometric distortion using elliptical curve fitting.

8. A computer readable medium on which is stored instructions for performing the method of claim 1 when executed by a computer.

9. A method of decoding a digital watermark from a watermarked media signal comprising:
    detecting a first digital watermark in the watermarked media signal, the first digital watermark enabling calibration of the watermarked media signal; and
    quantizing elements of the calibrated watermarked media signal to extract values corresponding to message symbols of a secondary digital watermark; wherein the first digital watermark is used to determine quantizing of elements for extracting the secondary digital watermark.

10. The method of claim 9 wherein the first digital watermark includes a direct sequence or frequency hopping spread spectrum digital watermark.

11. The method of claim 9 wherein the first watermark is generated by spreading a message over a carrier signal to produce a modified carrier and is detected using correlation with the carrier signal.

12. The method of claim 9 wherein the first watermark carries a key to extract the secondary watermark.

13. The method of claim 12 wherein the key specifies watermark parameters used in quantizing the watermarked signal to embed the secondary watermark.

14. The method of claim 9 wherein the first digital watermark includes a reference signal having a circular pattern that is used to compensate for geometric distortion using elliptical curve fitting.

15. A computer readable medium on which is stored instructions for performing the method of claim 9 when executed by a computer.

* * * * *